US010673778B2

(12) United States Patent
Pfister et al.

(10) Patent No.: US 10,673,778 B2
(45) Date of Patent: *Jun. 2, 2020

(54) TRANSPARENT AND EFFICIENT MULTI-DESTINATION TCP COMMUNICATIONS BASED ON BIT INDEXED EXPLICIT REPLICATION

(71) Applicant: Cisco Technology, Inc., San Jose, CA (US)

(72) Inventors: Pierre Pfister, Angers (FR); Pascal Thubert, La Colle sur Loup (FR); Victor Nguyen, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,098

(22) Filed: Nov. 2, 2018

(65) Prior Publication Data
US 2019/0075061 A1   Mar. 7, 2019

Related U.S. Application Data

(63) Continuation of application No. 15/252,101, filed on Aug. 30, 2016, now Pat. No. 10,135,756.

(51) Int. Cl.
*H04L 12/927* (2013.01)
*H04L 12/18* (2006.01)
*H04L 29/06* (2006.01)

(52) U.S. Cl.
CPC ........ *H04L 47/806* (2013.01); *H04L 12/1868* (2013.01); *H04L 69/161* (2013.01); *H04L 2212/00* (2013.01)

(58) Field of Classification Search
CPC . H04L 47/806; H04L 12/1868; H04L 69/161; H04L 2212/00
See application file for complete search history.

(56) References Cited

U.S. PATENT DOCUMENTS

| 9,338,019 | B2 | 5/2016 | Bestler et al. |
| 2016/0087890 | A1 | 3/2016 | Przygienda et al. |
| 2016/0127142 | A1 | 5/2016 | Tian et al. |
| 2016/0134518 | A1 | 5/2016 | Callon et al. |
| 2016/0191372 | A1 | 6/2016 | Zhang et al. |

*Primary Examiner* — Habte Mered
(74) *Attorney, Agent, or Firm* — Polsinelli PC

(57) ABSTRACT

Systems, methods, and computer-readable storage media for multi-destination TCP communications using bit indexed explicit replication (BIER). In some examples, a system can generate a TCP packet associated with a TCP session involving a set of destination devices, and encode an array of bits into the TCP packet to yield a TCP multicast packet. The array of bits can define the destination devices as destinations for the multicast packet. The system can transmit the TCP multicast packet towards the destination devices through a BIER domain. The system can receive acknowledgements from a first subset of the destination devices. Based on the acknowledgements, the system can determine that the first subset of the destination devices received the multicast packet and a second subset of the destination devices did not receive the multicast packet. The system can then retransmit the multicast packet to the second subset of the destination devices.

20 Claims, 8 Drawing Sheets

TRANSPARENT AND EFFICIENT MULTI-DESTINATION TCP COMMUNICATIONS BASED ON BIT INDEXED EXPLICIT REPLICATION

CROSS-REFERENCE TO RELATED APPLICATIONS

This application is a Continuation of U.S. application Ser. No. 15/252,101, filed on Aug. 30, 2016, the content of which is incorporated herein by reference in its entirety.

TECHNICAL FIELD

The present technology pertains to multicast communications, and more specifically, the present technology involves multicast transmissions based on bit indexed explicit replication and transport protocols.

BACKGROUND

A large portion of today's internet traffic goes through content delivery networks which provide a limited set of data to a large number of destinations. These technologies generally rely on caching and replication. Replication allows content delivery networks to provide the same data to multiple destinations. Typically, content delivery networks perform replication through IP multicast communications or overlay networks. IP multicast enables replication by allowing the data to be sent to all end-hosts. Unfortunately, IP multicast retransmissions can be significantly inefficient, as IP multicast lacks a mechanism for limiting the data transmitted during a retransmission to an arbitrary set of end-hosts. By contrast, overlay networks can greatly simplify replication. However, overlay networks require a significant amount of state to be maintained by intermediate nodes, which can become onerous More recently, a new multicast paradigm called bit indexed explicit replication (BIER) has emerged. Contrary to native IP multicast, BIER allows for data to be transmitted to an arbitrary set of end-hosts, which can be defined by a group of bits representing a selected set of end-hosts. However, BIER has limited efficiency and reliability, and lacks end-to-end flow control as well as backwards compatibility with connection-oriented transport layer protocols and communications.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
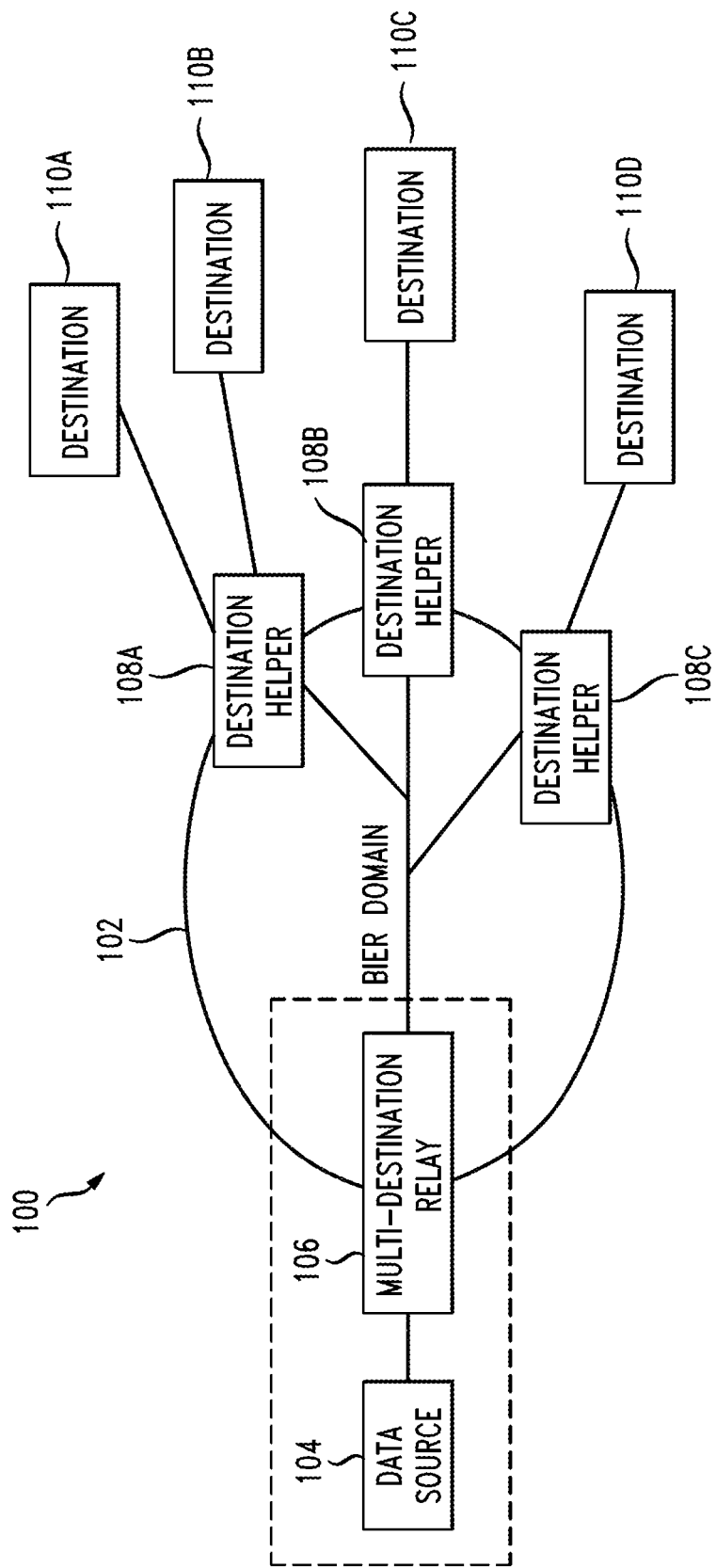
FIG. 1A and FIG. 1B illustrate schematic diagrams of example architectures for efficient and reliable multicast.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can provide efficient and reliable delivery of data from a source to multiple destinations specifically selected to receive the data. Moreover, the approaches herein provide backwards compatibility to transport layer stacks and protocols, such as transport control protocol (TCP) stacks. For example, BIER can be used to provide transparent and efficient multi-destination TCP.

Disclosed are systems, methods, and computer-readable storage media for transparent and efficient multi-destination transport layer communications using BIER. In some embodiments, an example system can generate a multicast BIER-encoded packet having an array of bits and a transport protocol segment. The array of bits can correspond to a set of destination devices for the packet. Moreover, the array of bits can be used by network devices in a BIER domain to route the packet to the corresponding destination devices.

For example, each bit in the array can represent a particular destination device. The bits can thus allow any intermediate nodes in the BIER domain that receive the multicast packet to determine where to forward the packet. The intermediate nodes can refer to a mapping table to identify which destination device is associated with a particular bit in the array of bits.

The multicast packet can allow the system to transmit data to multiple destination devices without sending the data separately or individually to all destination devices. For example, the multicast packet can allow the system to select a particular set of destination devices and transmit the data to the particular set in one multicast communication that is tailored only to the destination devices in the particular set. If retransmission is later necessary, the system can also modify the array of bits to modify the destinations of the multicast packet to a different set of destination devices, to limit the retransmission to only those destination devices in the different set. This can allow the system to avoid having to send the packet and data to any destination devices that do not need to receive the packet.

The system can transmit the multicast BIER-encapsulated packet to the set of destination devices through a BIER domain. As previously noted, any intermediate nodes in the BIER domain can refer to the array of bits to determine which destination nodes should receive the multicast BIER-encapsulated packet, in order to understand where to forward the multicast BIER-encapsulated packet.

The system can transmit the multicast BIER-encapsulated packet, including the TCP segment in the BIER-encapsulated packet, over the BIER domain to the set of destination devices. The multicast BIER-encapsulated packet can be configured to allow backwards compatibility with the transport layer stacks (e.g., TCP stacks) at the destination devices. Moreover, the transmission from the system to the destination devices can take into account transport layer state, such as acknowledgments sent or received, buffers and windows (e.g., TCP windows), etc.

The multicast BIER-encapsulated can be forwarded to the set of destination devices by one or more destination helper devices in the BIER domain. In some cases, the destination helper devices can decode the transport protocol segment from the multicast BIER-encapsulated and forward the transport protocol segment to the set of destination devices.

The system can receive acknowledgements from those destination devices that received the multicast BIER-encapsulated packet and/or the transport protocol segment. The acknowledgments can be responsive to the transport protocol segment in the multicast BIER-encapsulated packet. The acknowledgments can acknowledge the last transmission(s) received by the destination devices associated with the transport protocol session involving the set of destination devices. Further, the acknowledgments can include, without limitation, an acknowledgment number, a sequence number, one or more other acknowledgment flags or data, and so forth.

Based on the acknowledgements, the system can determine which destination devices received the multicast BIER-encapsulated packet and which destination devices did not. If one or more destination devices did not receive the multicast BIER-encapsulated packet, the system can retransmit the multicast BIER-encapsulated packet, including any associated data, to those one or more destination devices that did not receive the multicast BIER-encapsulated packet.

The system can limit the destinations of the retransmitted multicast BIER-encapsulated packet to those one or more destination devices that did not receive the multicast BIER-encapsulated packet, without also retransmitting the packet to those destination devices that did receive the packet. To retransmit the multicast BIER-encapsulated packet to those destination devices that did not receive the multicast BIER-encapsulated packet, the system can modify the multicast BIER-encapsulated packet or generate a new multicast BIER-encapsulated packet based on a modified array of bits. The modified array of bits can include bits corresponding to the destination devices for the retransmission, and exclude bits corresponding to those destination devices that did receive the multicast BIER-encapsulated packet previously transmitted.

DESCRIPTION

Figure 1B:
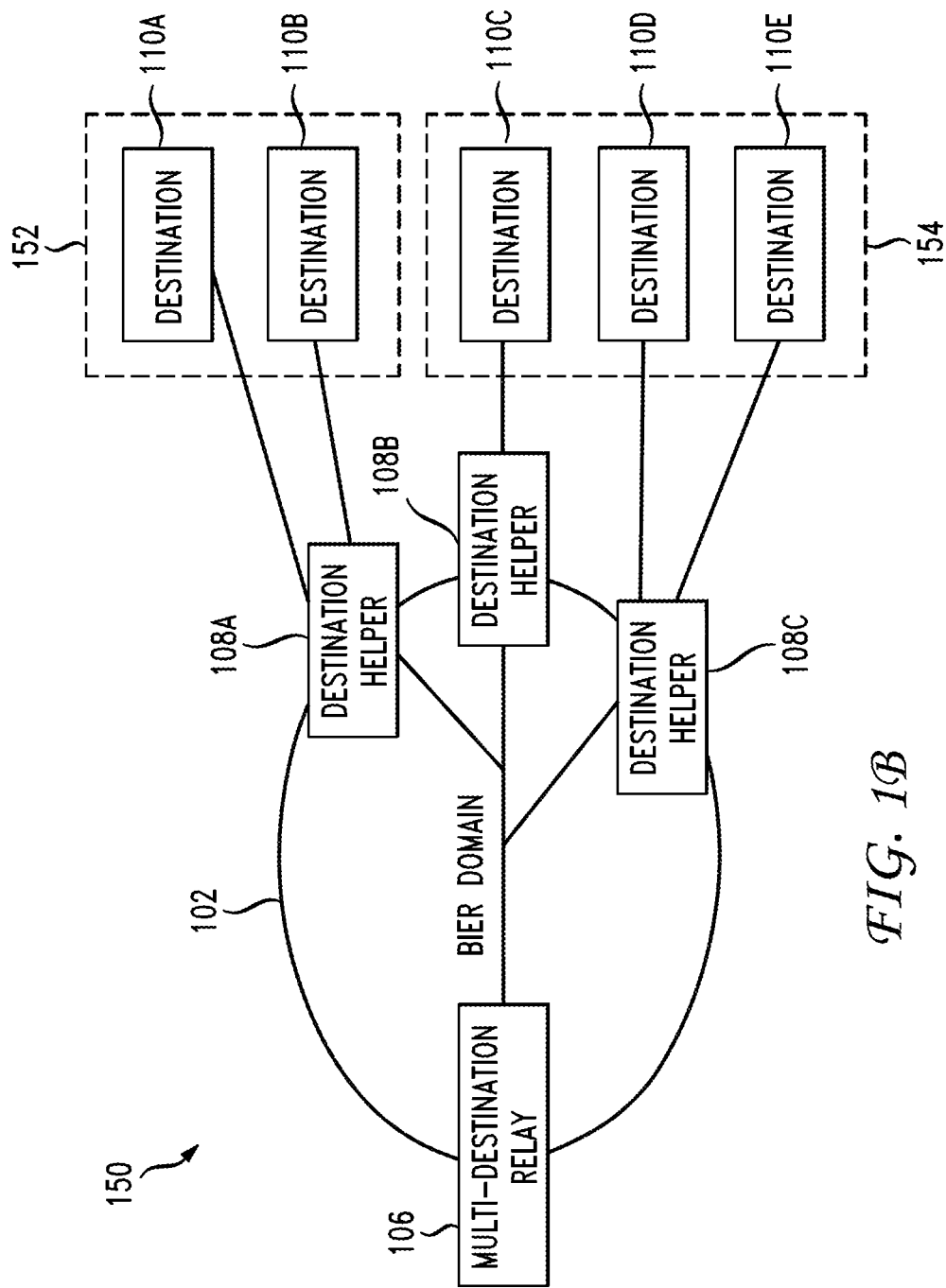
Figure 2:
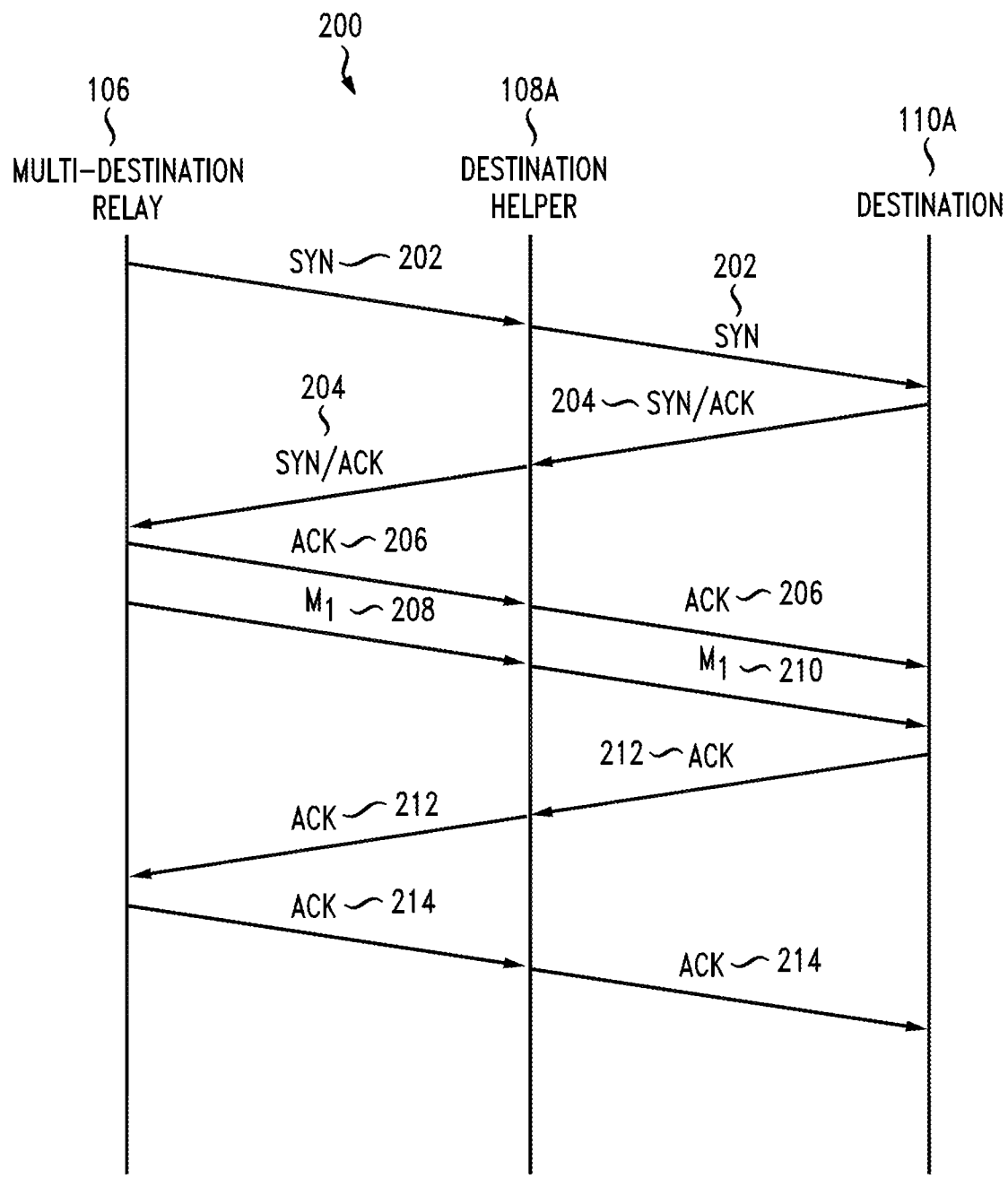
FIG. 2 illustrates an example transport protocol session.
Figure 3:
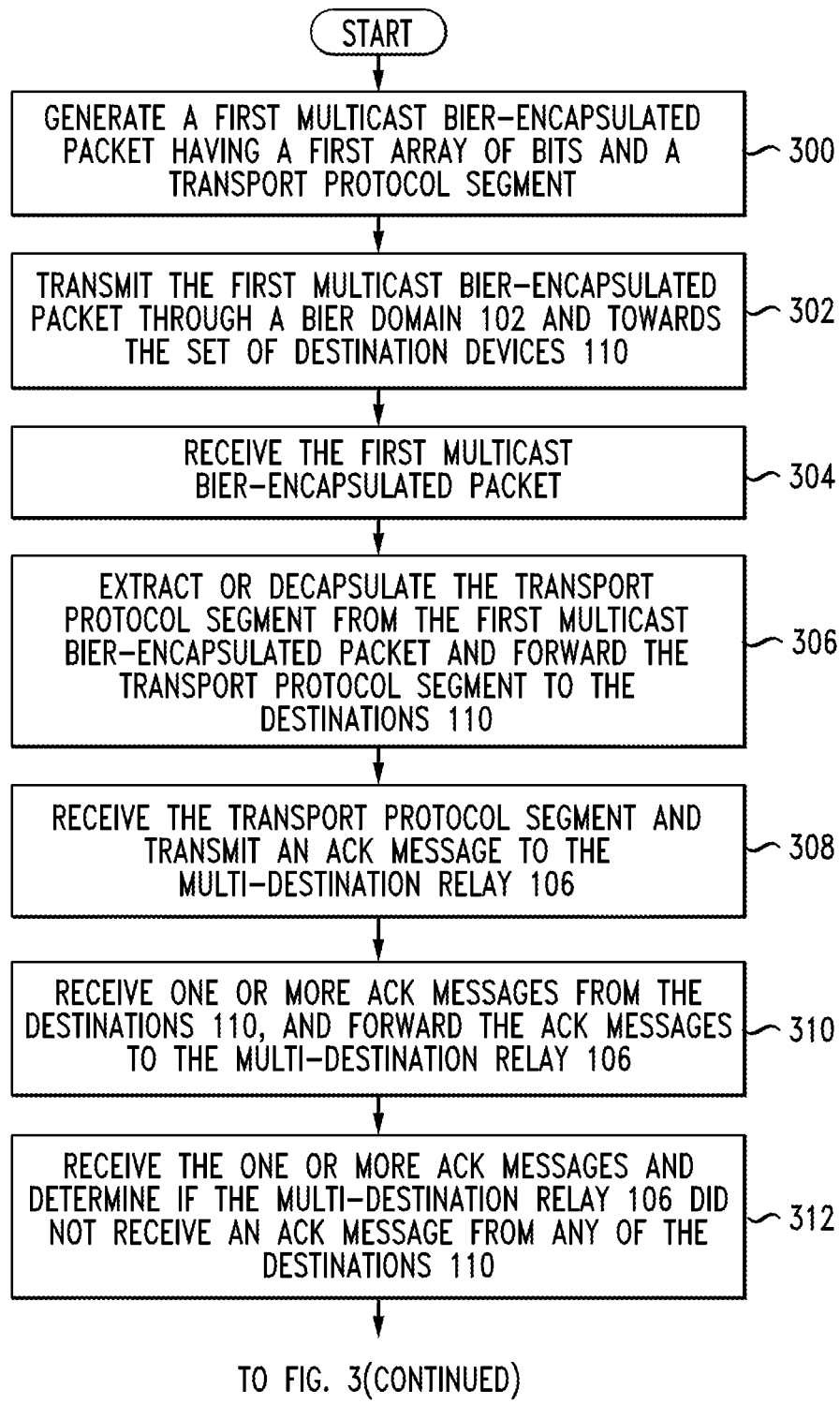
FIG. 3 illustrates an example method for efficient and reliable multicast.
Figure 3:
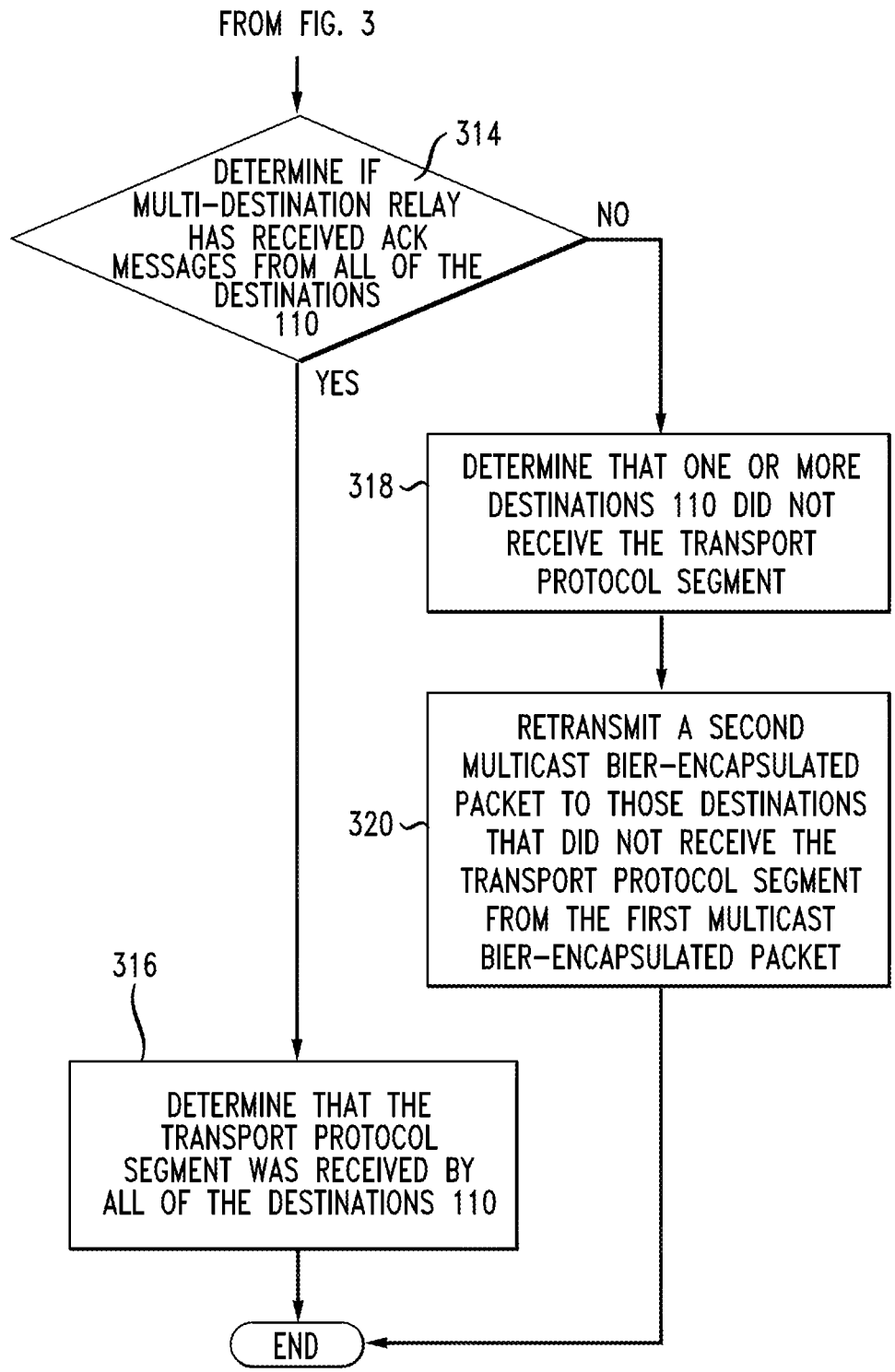
Figure 4:
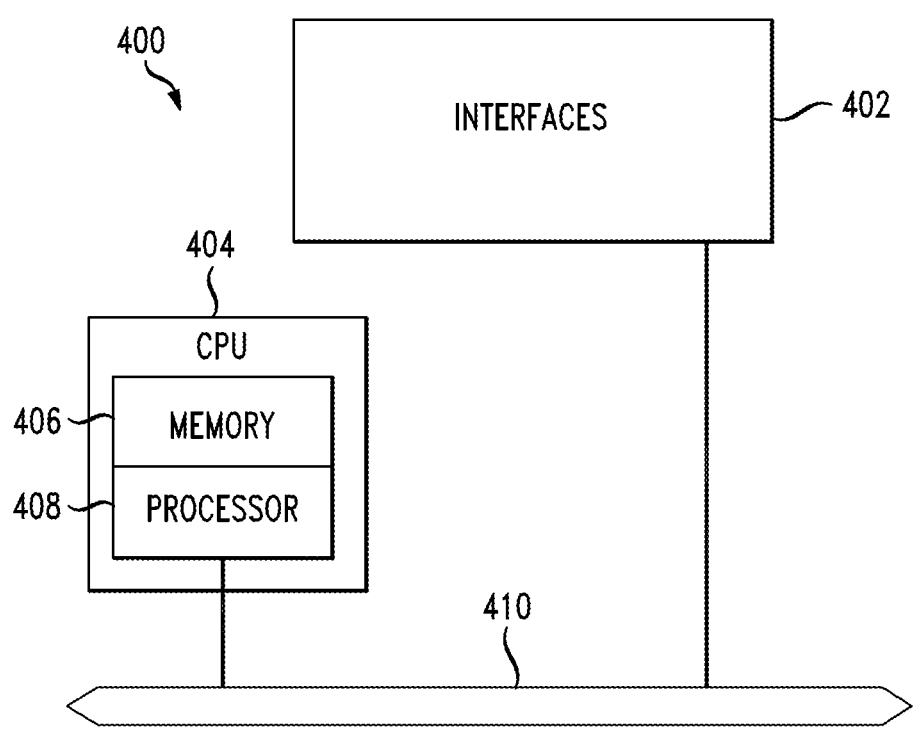
FIG. 4 illustrates and example network device.

The disclosed technology addresses the need in the art for efficient and reliable multicast. The present technology involves system, methods, and computer-readable media for efficient and reliable multicast using BIER multicast and transport-layer protocols. A description of architectures and network environments for efficient and reliable multicast using BIER and transport-layer protocols, as illustrated in FIGS. 1A and 1B, is first disclosed herein. A discussion of multicast using BIER multicast and transport-layer protocols, as illustrated in FIGS. 2-4, will then follow. The discussion then concludes with a brief description of example computing devices, as illustrated in FIGS. 5 and 6A-B. These variations shall be described herein as the various embodiments are set forth. The disclosure now turns to FIG. 1A.

FIG. 1A illustrates a schematic diagram of an example architecture 100 for multi-destination transport control protocol (TCP) communications using BIER. Data source 104 can provide data to multi-destination relay 106 that needs to be transmitted to destinations 110A-D (collectively "110" hereinafter). In some cases, the data source 104 can provide the data to multi-destination relay 106 as a unicast message or stream. To illustrate, the data source 104 can provide the data to the multi-destination relay 106 in a TCP stream, as an inter-process communication (IPC) or through system calls to a BIER-aware socket interface, for example.

Multi-destination relay 106 can obtain the data and provide the data to all destinations 110 in a reliable multicast transmission. For example, multi-destination relay 106 can establish a TCP session with destinations 110. In some cases, multi-destination relay 106 can establish individual TCP sessions with the destinations 110 and combine the individual sessions into a single TCP session with the destinations 110.

Multi-destination relay 106 can generate a multicast packet using BIER, to be transmitted to the destinations 110 through the BIER domain 102. BIER is a multicast forwarding technique requiring each packet to transport a bitmask field for which each bit set to 1 represents a destination the packet should reach. Each bit is therefore associated with a given destination for which the router knows the next-hop. The BIER domain 102 can include routers that are capable of supporting BIER, such as Bit-Forwarding Routers.

Moreover, the BIER domain 102 can implement BIER control plane protocols which allow routers within the BIER domain 102 to exchange the information needed for them to forward packets to each other using BIER. A further description of BIER, including the BIER architecture, is provided in Wijnands, et al. (Jul. 18, 2016), "MULTICAST USING BIT INDEX EXPLICIT REPLICATION", IETF, draft-ietf-bier-architecture-04, which is incorporated herein by reference in its entirety.

To ensure that the multicast packet gets transmitted over the BIER domain 102 to the correct destinations 110, the multi-destination relay 106 can set a bit in the multicast packet for each of the destinations 110. The bit can be set in a bitmask field encoded in the multicast packet for BIER forwarding. Each bit can represent a respective destination from the destinations 110. The bits can thus allow routers or devices in the BIER domain 102 to forward the packet to the appropriate destinations 110.

The BIER domain 102 can include destination helpers 108A-C (collectively "108" hereinafter), which are configured to support BIER. Destination helpers 108 can perform forwarding of BIER packets based on the bits in the bitmask field encoded in the multicast packets.

The destination helpers 108 can perform lightweight TCP stream tracking and packet modification. For example, the destination helpers 108 can keep track of each TCP connection in order to remember the last sequence number explicitly acknowledged by the data source 104 or the multi-destination relay 106 (e.g., when the acknowledgment bit is set by 1).

The destination helpers 108 can extract TCP segments from BIER packets and send them to the destinations 110 as IP packets. This can allow the destinations 110 to receive and process the packets from the BIER domain 102 without having to implement or support BIER. When forwarding a TCP segment to a destination 110, if the acknowledgment flag is not set on it, the destination helper 108 can set the acknowledgment bit to 1, fill the acknowledgment sequence number with a cached value associated with the same stream (e.g., a value cached when the connection was established), and correct the TCP checksum. If the acknowledgment flag is set, the acknowledgment sequence number can be cached by the destination helper 108.

The destinations 110 can receive the packet with the TCP segment from the destination helpers 108. The destinations 110 may perceive the received packet as a unicast packet, as the BIER multicast process can be transparent to the destinations 110.

The destinations 110 can have an unmodified TCP stack. Moreover, the destinations 110 can receive the TCP segments, and send data and/or messages back to the data source 104 and/or multi-destination relay 106 as a unicast.

The destinations 110 can receive the TCP segment and data from the destination helpers 108, and transmit an acknowledgment towards to the data source 104. The acknowledgment can include the acknowledgment sequence number for the data received by the destinations 110. The destination helpers 108 can receive the acknowledgments from the destinations 110 and forward the acknowledgements to the multi-destination relay 106. The destination helpers 108 can also cache the acknowledgment number in the acknowledgment packet. Thus, next time the destination helpers 108 receive a packet for the destinations 110, the destination helpers 108 will be able to set the acknowledgment number and also set the acknowledgment bit to 1.

The multi-destination relay 106 can then receive acknowledgments forwarded by the destination helpers 108 from the destinations 110. The multi-destination relay 106 can track the acknowledgments received from the destinations 110 to determine if the multi-destination relay 106 has not received an acknowledgment from any particular destination. Moreover, the multi-destination relay 106 may cache the transmitted data chunks until all destinations 110 have explicitly acknowledged receipt.

If the multi-destination relay 106 determines that one or more destinations 110 have not acknowledged the data, it can retransmit the data to those destinations, without also retransmitting the data to those destinations that did receive the data. For example, the multi-destination relay 106 can adjust the bits in the bitfield mask encoded in the multicast packet to remove the bits for those destinations that did acknowledge receiving the data and only include the bits for which the multi-destination relay 106 did not receive an acknowledgement. The multi-destination relay 106 can then retransmit the multicast packet with the modified bits to the destination helpers 108 over the BIER domain 102. The destination helpers 108 can then transmit the TCP segments to the appropriate destinations as previously described.

The multi-destination relay 106 can keep the individual TCP state (e.g., windows, acknowledgment sequence numbers, etc.) for each flow. The multi-destination relay 106 can use the state to ensure that packets sent to the destinations 110 are compliant with the TCP retransmits and congestion mechanisms of the destinations 110. For example, the multi-destination relay 106 can keep track of the sending window or buffer. The multi-destination relay 106 can hold off sending more data to the destinations 110 until the multi-destination relay 106 has received acknowledgments for the data that is in the sending window or buffer.

Referring to FIG. 1B, the multi-destination relay 106 can split or divide the destinations 110 into sets 152 and 154, to break up subsequent multicast transmissions. For example, the multi-destination relay 106 can modify the BIER bits in the multicast packet to exclude the bits which correspond to destinations 110A and 110B, to ensure that the multicast packet is not transmitted to destinations 110A and 110B. Thus, after the bits are modified, the destinations configured on the multicast packet will be limited to destinations 110C and 110D from set 154.

The multi-destination relay 106 can then create a multicast packet having BIER bits that specify the destinations 110A and 110B in set 152 as the destinations. This multicast packet will then be transmitted to the destinations 110A and 110B in the set 152.

The multi-destination relay 106 can divide the destinations 110 into sets 152 and 154 based on various reasons, as further explained below. For example, the multi-destination relay 106 can divide the destinations 110 into sets 152 and 154 based on performance. To illustrate, if the destinations 110A and 110B are slower in responding (e.g., sending ACK messages) to communications from the multi-destination relay 106, then those destinations 110A and 110B can be divided into a different set 152 to prevent those destinations 110A and 110B from slowing down the communications with the other destinations 110C and 110D. The multi-destination relay 106 can then generate a different multicast packet for destinations 110A and 110B in set 152, as previously explained, which it can use to communicate with those destinations 110A and 110B at the slower pace of the destinations 110A and 110B.

Similarly, by removing destinations 110A and 110B from the set of destinations 110 in the original multicast packet, the multi-destination layer 110 can from set 154 with only destinations 110C and 110D, and continue communicating with those destinations at the faster pace.

As another example, the multi-destination relay 106 can divide the destinations 110 into sets 152 and 154 in order to send different data to different destinations. To illustrate, in a TCP flow, some chunks of data might be the same for every destination, while other chunks may differ depending on the destination set. Accordingly, the different sets 152, 154 may be used to send the different data chunks.

The multi-destination relay 106 can also add destinations to a set of destinations configured on a multicast packet. For example, the multi-destination relay 106 can add destination 110E to destination set 154 by adding a corresponding BIER bit to the multicast packet. The destination 110E can be added for various reasons. For example, if data source 104 needs to also send the data to destination 110E, it can add destination 110E to the destination set 154 to ensure that destination 110E also receives the data when transmitted to the destination set 154. As another example, if destination 110E is split from another set, the multi-destination relay 106 can add the destination 110E to the destination set 154 if the multi-destination relay 106 determines that the destination 110E needs to receive the same data and may have the same or similar parameters (e.g., speed or pace of communications, TCP parameters, etc.).

While the data source 104 and multi-destination relay 106 are illustrated in FIGS. 1A and 1B as separate systems, it should be noted that in some cases, the data source 104 and multi-destination relay 106 can reside within the same system. Similarly, in some cases, the destination helpers 108 can reside on the destinations 110.

Having described an example architecture, the disclosure now turns to an overview of multi-destination TCP communications using BIER. The TCP communications can involve TCP end-to-end with a BIER aware stack at the data source or relay. The data source can reliably provide the data to the multi-destination relay in various ways. For example, the source can provide the data via a TCP stream, as an inter-process communication (IPC), or through system calls to a BIER-aware socket interface.

The multi-destination relay can receive the data flow and cache the data chunks transmitted to the destinations, until all destinations have explicitly acknowledged receipt of the data flow/chunks. The multi-destination relay can include a BIER stack which allows the multi-destination relay to send TCP packets to an arbitrary set of destinations. For a given flow, the multi-destination relay can keep a TCP state (e.g., TCP windows, acknowledgments, acknowledgment sequence numbers, etc.) for each destination. This state can be used in order to ensure the packets sent to the destinations are compliant with the TCP retransmit and congestion mechanisms of all the destinations.

In some cases, the expectation can be that the destinations consume the data at approximately the same speed, which can be controlled to the slowest denominator by the source in order to maintain the outstanding amount of data below a certain threshold. Destinations that appear to be too slow or unresponsive can be separated from the faster destinations, by dynamically and transparently creating two or more destination sets with different rates.

The destination helper can perform lightweight TCP stream tracking and packet modifications. In some cases, the amount of packet modifications may depend on the way BIER is implemented. The destination helper can keep track of each TCP connection in order to remember the last sequence number explicitly acknowledged by the source or multi-destination relay (e.g., when the acknowledgment bit is set by 1). The destination helper can extract TCP segments from BIER packets and send them to the destinations as IP packets. Since the destinations receive the packets as IP packets, the destinations do not have to implement BIER.

When forwarding a TCP segment to a destination, if the acknowledgment flag is not set, the destination helper can set the acknowledgment bit to 1, fills the acknowledgment sequence number with the cached value associated with the same stream, and correct the TCP checksum. If the acknowledgment flag is set, the acknowledgment sequence number can be cached by the destination helper.

The destinations can implement an unmodified destination TCP stack. The destinations can receive regular TCP segments, and can send data back to the source as unicast packets. Backward unicast segments can be acknowledged by the source as unicast.

The sets of destinations involved in a TCP communication can be dynamically adjusted for various reasons, such as performance and efficiency. For example, in some cases, to reduce the amount of used networking resources, the multi-destination relay 106 can send data to all of the destinations which have not yet acknowledged the data. However, this may result in the rate to all destinations being capped by the slowest of the destinations. Accordingly, the multi-destination relay 106 can observe when some destinations are slower than others and send data specifically to destinations that are ahead, while waiting for the slower destinations. The multi-destination relay 106 can identify that some destinations are slower than others in various ways. For example, the destination can monitor how much of the TCP sending window is unused due to limitations of the slowest destination.

If the slower destinations continue to run slower or cause delays, the multi-destination relay 106 can a split the set of destinations between slow and fast destinations. Sets of destinations can be divided further or merged again, as necessary.

In some cases, it is also possible to throttle down some destinations in order to allow the slowest destinations to catch up. For example, the multi-destination relay may throttle communications to the fastest destinations until the slower destinations catch up. If the problem persists, the multi-destination can continue to throttle communications, split the set of destinations into faster and slower sets, or both.

To avoid a significant trade-off between transmission delay and network resources consumption, the multi-destination relay can dynamically adjust parameters for splitting a set of destinations or adding/removing destinations to a set, in order to optimize the transmission delay while making sure that networking resources are not exhausted.

Destinations can also be added and removed from a multi-destination flow as necessary. For example, destinations can be added or removed by sending unicast SYN and FIN/RESET packets and changing the sending state accordingly. When adding a new destination, the first sent byte can be arbitrarily chosen. New destinations can be added or removed for various reasons, such as performance, service changes, requests, etc. For example, destinations can be added or removed from the multi-destination flow in live-content streaming contexts which generally involve a destinations set that dynamically changes.

In some examples, the multi-destination relay can terminate the TCP connection from the data source. A reliable multicast operation can be performed between the multi-destination relay and the multiple destination helpers, whereby the relay interprets the BIER-based address and route. In this example, a hierarchy of relays may be deployed that perform a BIER multicast operation at each level. The destination helpers can turn the reliable multicast operation into unicast TCP and transform the BIER addresses into unicast addresses.

Moreover, in some examples, a shim layer, such as HIP (Host Identity Protocol), can be used to transform a classical address as seen by the upper stack into a BIER-based address. The BIER-based address can also change as additional listeners join, unbeknownst of the application. Listeners can be added by forging a SYN, SYN-ACK, ACK exchange from the relay, as discussed above.

As illustrated above, the multi-destination relay can dynamically manage the set of destinations, allowing for splits and merges depending on the current efficiency/delay desired tradeoff, as well as any service requirements. The multi-destination relay can allow new destinations to be added dynamically to an on-going stream.

In some cases, the multi-destination relay can allow sets of destinations to receive partial data from the streams depending on authorization and policies.

The approaches herein can also mitigate acknowledgment storms using BIER and acknowledgement aggregation. TCP generally requires that acknowledgements be sent by all destinations directly to the source. In some cases, this can create an enormous amount of communications on the network, commonly referred to as an "acknowledgement storm".

However, acknowledgment storms can be mitigated herein by aggregating acknowledgments from destinations to the multi-destination relay such that, as acknowledgements travel back towards the source, a bitstring encoding the set of destinations actually acknowledging the same data is constructed within the packet. Therefore, the multi-destination relay receives a limited number of acknowledgements including a bitstring that can be used to acknowledge data from multiple destinations instead of just one. This process can include a reversed BIER bitstring building process.

As noted above, BIER can allow for sending a given packet to a selected set of destinations based on the transport layer state (e.g., received acknowledgments, TCP windows, etc.) of a flow or session. Since destinations randomly pick their sequence number during a TCP handshake, in some cases, TCP data packet can be transmitted towards destinations with the acknowledgment flag not set, such that the acknowledgment flag can be set by the destination helper. This can enable backward traffic to be sent as unicast from destinations to sources.

The multi-destination relay can keep track of the TCP state of all the destinations, and use the TCP state when sending back data to multiple destinations such that the transmission is compliant with the TCP specifications of all those destinations.

While the above examples provided herein refer to TCP as the transport layer protocol, the examples herein can also be implemented using other transport layer protocols. For example, in some cases, SCTP (Stream Control Transmission Protocol) can be used instead of TCP. SCTP can allow for dynamic mapping of streams and listeners, so that not all listeners receive all SCTP streams. Registration or policies may be employed to decide which listener gets which stream. SCTP may also be used only between the relays and the helpers, in order to mix TCP and UDP flows in a single federated reliable multicast transport.

The disclosure now turns to FIG. 2, which illustrates an example transport-layer stream 200 between multi-destination relay 106 and destination 110A. The multi-destination relay 106 can send a SYN message 202 to the destination 110A. The destination helper 108A can receive the SYN message 202 and forward it to the destination 110A. The destination 110A can receive the SYN message 202 and send a SYN/ACK message 204 to multi-destination relay 106. The SYN/ACK message 204 can include, without limitation, an acknowledgment sequence number and an acknowledgment number.

The destination helper 108A can receive the SYN/ACK message 204 and forward it to the multi-destination relay 106. The destination helper 108A can also cache information in the SYN/ACK message 204, such as the acknowledgment number, the acknowledgment sequence number, etc.

The multi-destination relay 106 can receive the SYN/ACK message 204 and send an ACK message 206 to the destination 110A. After the handshake has been established, the multi-destination relay 106 can send subsequent data packets to the destination 110A.

The destination helper 108A can cache information from the ACK message 206. For example, the destination helper 108A can cache the acknowledgment numbers and/or acknowledgment sequence numbers sent from the multi-destination relay 106 to destination 110A.

The multi-destination relay 106 can send a message 208 to the destination 110A. The message 208 can include, for example, an acknowledgment and data for the destination 110A. The destination helper 108A can receive the message 208 and forward the message 210 to the destination 110A. The message 210 can be the same as message 208. However, in some cases, the message 210 can include modifications to message 208. For example, if message 208 does not have an acknowledgment flag, acknowledgment sequence number, or acknowledgment number set, the destination helper 108A can set any of that information in the message 210.

The destination 110A can receive the message 210, and subsequently send an ACK 212 to the multi-destination relay 106. The destination helper 108A can receive the ACK 212 and forward it to the multi-destination relay 106. The destination helper 108A can also cache information from the ACK 212, such as acknowledgment number, acknowledgment sequence number, etc.

The multi-destination relay 106 can receive the ACK 212 and determine that the destination 110A received the message 208. The multi-destination relay 106 can also respond with an ACK 214 to the destination 110A.

Having disclosed some basic system components and concepts, the disclosure now turns to the example method shown in FIG. 3. For the sake of clarity, the methods are described in terms of the network 100 shown in FIGS. 1A and 1B. The steps outlined herein are exemplary and can be implemented in any combination thereof, including combinations that exclude, add, or modify certain steps.

At step 300, the multi-destination relay 106 can generate a first multicast BIER-encapsulated packet having a first array of bits (e.g., BIER bits) and a transport protocol segment (e.g., TCP segment). The bits in the first array of bits can respectively define a set of destination devices 110 as respective destinations for the first multicast BIER-encapsulated packet.

At step 302, the multi-destination relay 106 can transmit the first multicast BIER-encapsulated packet through a BIER domain 102 and towards the set of destination devices 110. The first multicast BIER-encapsulated packet can be routed through the BIER domain 102 based on the array of bits which identifies the destinations 110 of the packet.

At step 304, the destination helpers 108 can receive the first multicast BIER-encapsulated packet. If the first multicast BIER-encapsulated packet does not include an acknowledgment sequence number, the destination helpers 108 can encode a cached acknowledgement sequence number into the packet. The cached acknowledgment sequence number can be based on a previous SYN/ACK message transmitted by the destinations 110 when establishing the transport protocol connection or session.

At step 306, the destination helpers 108 can extract or extract the transport protocol segment from the first multicast BIER-encapsulated packet and forward the transport protocol segment to the destinations 110. As previously noted, the destination helpers 108 can identify the destinations 110 for the transport protocol segment based on the array of bits in the first multicast BIER-encapsulated packet.

At step 308, one or more of the destinations 110 can receive the transport protocol segment and transmit an ACK message to the multi-destination relay 106.

At step 310, the destination helpers 108 can receive one or more ACK messages from the destinations 110, and forward the ACK messages to the multi-destination relay 106.

At step 312, the multi-destination relay 106 can receive the one or more ACK messages and determine if the multi-destination relay 106 did not receive an ACK message from any of the destinations 110.

At step 314, the multi-destination relay 106 can determine if it has received ACK messages from all of the destinations 110. If the multi-destination relay 106 determines that it received ACK messages from all the destinations 110, at step 316, the multi-destination relay 106 can determine that the transport protocol segment was received by all of the destinations 110. If necessary, the multi-destination relay 106 can proceed to send any additional data to the destinations 110.

If the multi-destination relay 106 determines that it did not receive ACK messages from one or more of the destinations 110, at step 318, the multi-destination relay 106 can determine that one or more destinations 110 did not receive the transport protocol segment. The destinations that are assumed to not have received the transport protocol segment can be those destinations for which the multi-destination relay 106 did not receive an ACK message. Thus, the multi-destination relay 106 can infer that a destination did not receive the transport protocol segment when the multi-destination relay 106 does not receive an ACK message from that destination.

The ACK messages can be responsive to the transport protocol segment in the first multicast BIER-encapsulated packet transmitted by the multi-destination relay. Moreover, the ACK messages can be associated with a transport protocol session or connection associated with the transport protocol segment.

At step 320, the multi-destination relay 106 can retransmit a second multicast BIER-encapsulated packet to those destinations that did not receive the transport protocol segment from the first multicast BIER-encapsulated packet. The second multicast BIER-encapsulated packet can include the transport protocol segment and a second array of bits. The second array of bits can include bits corresponding to the destinations that did not receive the transport protocol segment from the first multicast BIER-encapsulated packet, which are the intended destinations of this second multicast BIER-encapsulated packet. The array of bits can thus define those destinations that did not receive the transport protocol segment from the first multicast BIER-encapsulated packet, as the respective destinations of the second multicast BIER-encapsulated packet.

The multi-destination relay 106 can maintain the state (e.g., send window or buffer, acknowledgment numbers, connection information, etc.) of the transport protocol session or connection, to ensure that any transmissions (e.g., first and second multicast BIER-encapsulated packets) to the destinations 110 comport with the state and the transport protocol parameters at the destinations 110.

If the multi-destination relay 106 determines that one or more new destinations need to receive data being transmitted to the destinations 110 via the multicast BIER-encapsulated packets, the multi-destination relay 106 can add the destination to the set of destinations for the multicast BIER-encapsulated packets to ensure that destination also receives the data.

Similarly, if the multi-destination relay 106 determines that one or more of the destinations 110 should be removed from the set of destinations defined for the multicast BIER-encapsulated packets, the multi-destination relay 106 can modify the array of bits in the multicast BIER-encapsulated packets to remove any bits corresponding to the one or more destinations to be excluded. Destinations can be removed from the set of destinations and/or the set of destinations can be divided into subsets for various reasons, such as performance, flow control, preferences, etc. For example, the multi-destination relay 106 may divide a set of destinations into subsets in order to separate the faster destinations from the slower destinations, to allow the transmissions to continue without unnecessary delays. Subsets of destinations can also be further divided as necessary, and other destinations can also be added to specific subsets. The set(s) of destinations can be dynamically and continuously monitored and adapted based on the communications and circumstances.

The transport protocol associated with the transport protocol segment and the transport protocol session or connection can be any transport layer protocol, such as TCP and SCTP. Moreover, to transmit multicast BIER-encapsulated packets to the destinations 110, the multi-destination relay 106 can first establish a transport protocol connection (e.g., TCP connection or session), which it can then use to communicate the multicast BIER-encapsulated packets and content data. In some cases, the multi-destination relay 106 can form transport protocol connections with each of the destinations 110, and combine the individual transport protocol connections into a single transport protocol connection. The multi-destination relay 106 can use the acknowledgments obtained from the destinations 110 through the transport protocol connection to determine retransmissions and packet destinations.

Figure 5A:
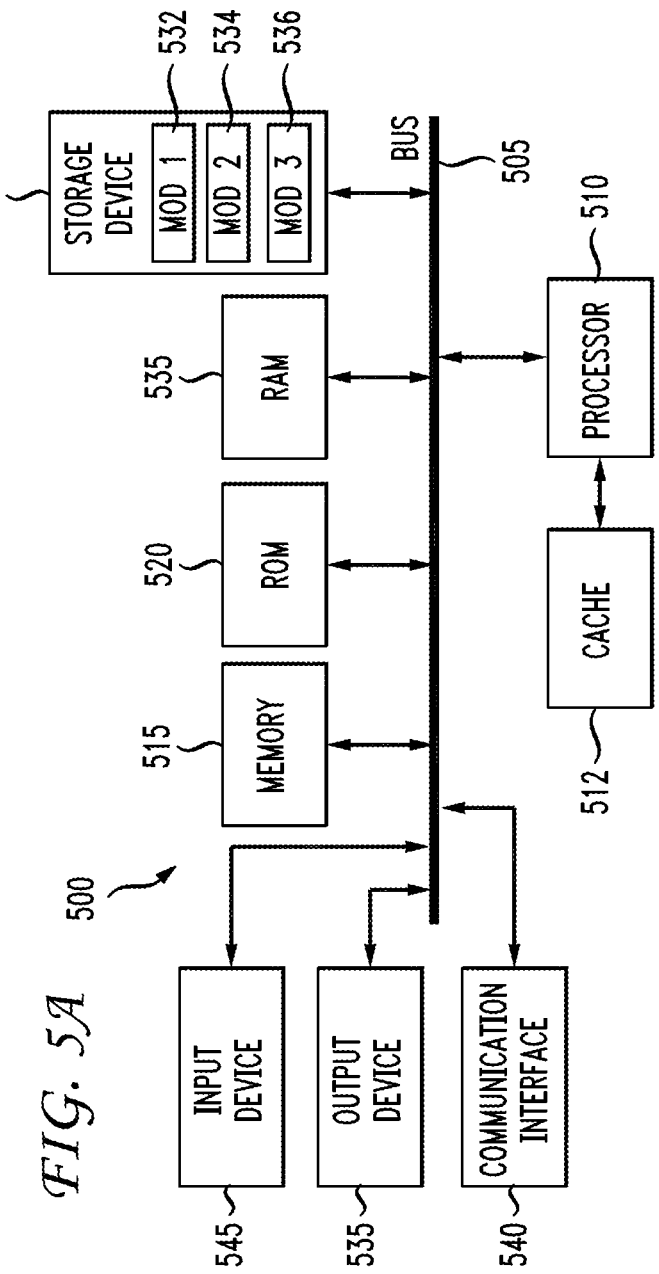
FIG. 5A and FIG. 5B illustrate example system embodiments.
Figure 5B:
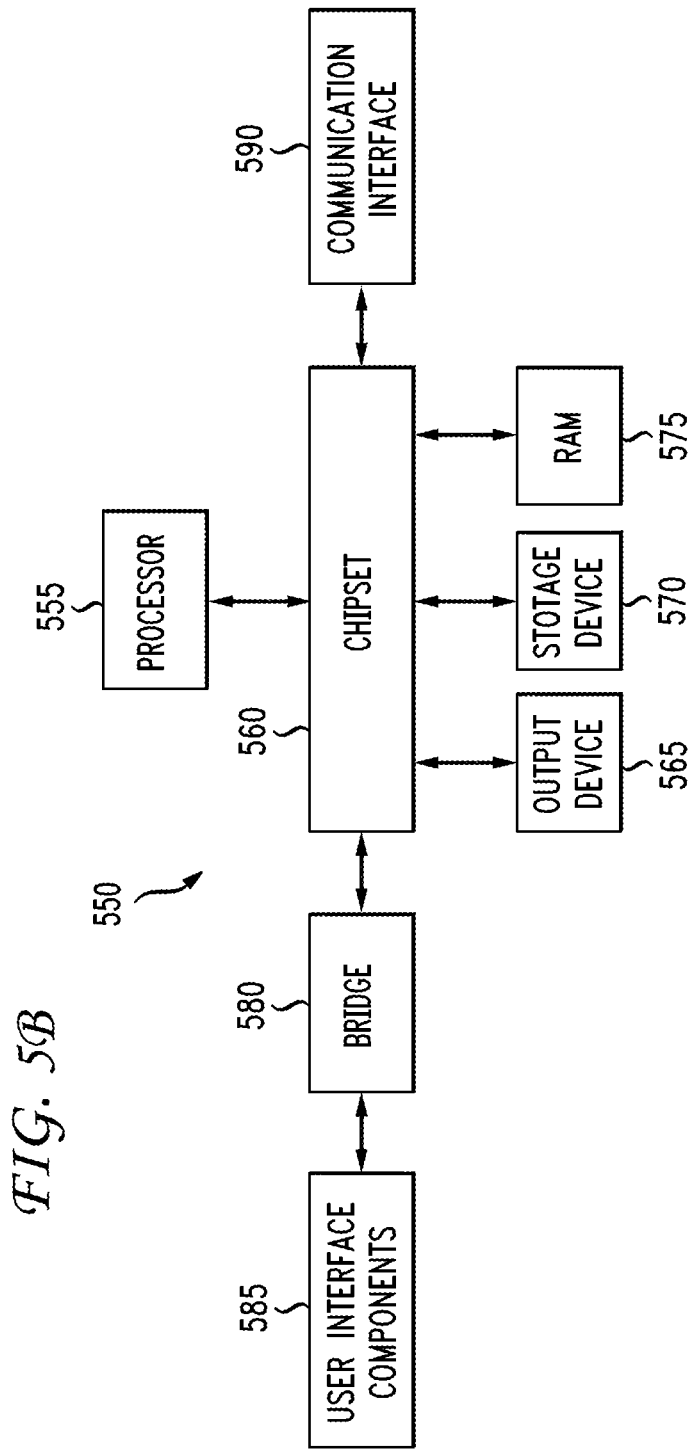

The disclosure now turns to FIGS. 4 and 5A-B, which illustrate example devices.

FIG. 4 illustrates an example network device 400 suitable for performing switching, port identification, and/or port verification operations. Network device 400 includes a master central processing unit (CPU) 404, interfaces 402, and a bus 410 (e.g., a PCI bus). When acting under the control of appropriate software or firmware, the CPU 404 is responsible for executing packet management, error detection, and/or routing functions. The CPU 404 preferably accomplishes all these functions under the control of software including an operating system and any appropriate applications software. CPU 404 may include one or more processors 408 such as a processor from the Motorola family of microprocessors or the MIPS family of microprocessors. In an alternative embodiment, processor 408 is specially designed hardware for controlling the operations of network device 400. In a specific embodiment, a memory 406 (such as non-volatile RAM, a TCAM, and/or ROM) also forms part of CPU 404. However, there are many different ways in which memory could be coupled to the system.

The interfaces 402 are typically provided as interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 404 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 5A and FIG. 5B illustrate example system embodiments. The more appropriate embodiment will be apparent to those of ordinary skill in the art when practicing the present technology. Persons of ordinary skill in the art will also readily appreciate that other system embodiments are possible.

FIG. 5A illustrates a system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 570 and random access memory (RAM) 575, to the processor 510. The system 500 can include a cache of high-speed memory connected directly with, in close proximity to, or integrated as part of the processor 510. The system 500 can copy data from the memory 515 and/or the storage device 530 to the cache 517 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 575, read only memory (ROM) 570, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 560 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   generating a first packet comprising a first array of bits and a transport protocol segment, wherein the first array of bits respectively defines a set of destination devices as respective destinations for the first packet;
   transmitting, by a multi-destination relay, the first packet towards the set of destination devices;
   receiving, by the multi-destination relay, one or more acknowledgements from a first subset of the set of destination devices;
   based on the one or more acknowledgements, determining, by the multi-destination relay, that the first subset of the set of destination devices received the transport protocol segment in the first packet, and a second subset of the set of destination devices did not receive the transport protocol segment in the first packet;
   retransmitting, by the multi-destination relay, a second packet to the second subset of the set of destination devices, wherein the second packet comprises a second array of bits, wherein the second array of bits respectively defines the second subset of the set of destination devices as the respective destinations for the second packet; and
   maintaining, by the multi-destination relay, a transport layer state for each respective flow to the set of destination devices, the transport layer state comprising at least one of a send window, a receive window, one or more received acknowledgment numbers, and one or more acknowledgment sequence numbers.

2. The method of claim 1, further comprising:
   generating a second multicast packet by modifying the first array of bits to yield the second array of bits, wherein the first array of bits is modified by removing bits corresponding to the first subset of the set of destination devices; and
   wherein retransmitting the second multicast packet comprises transmitting the second multicast packet to the second subset of the set of destination devices.

3. The method of claim 2, wherein transmitting the first multicast packet comprises transmitting content data for the set of destination devices, and wherein retransmitting the second multicast packet comprises retransmitting the content data only to those destination devices in the second subset of the set of destination devices.

4. The method of claim 1, further comprising:
   prior to retransmitting, determining whether the retransmission would result in transmission of an amount of data that exceeds the send window.

5. The method of claim 1, further comprising:
   determining that a respective acknowledgment has not been received from a third subset of the set of destination devices within a threshold period of time;
   splitting the set of destination devices into a first group of destination devices and a second group of destination devices, the first group comprising the third subset of the set of destination devices, and the second group comprising all other destination devices from the set of destination devices;
   generating a third multicast packet which comprises a third array of bits which identifies the first group of destination devices as the respective destinations for the third multicast packet; and
   generating a fourth multicast packet which comprises a fourth array of bits which identifies the second group of destination devices as the respective destinations for the fourth multicast packet.

6. The method of claim 5, further comprising:
   transmitting the third multicast packet toward the first group of destination devices, the third multicast packet being transmitted at a first time determined based on transport layer state; and
   transmitting the fourth multicast packet toward the second group of destination devices, the fourth multicast packet being transmitted at a second time determined based on transport layer state.

7. The method of claim 1, wherein the first subset of the set of destination devices comprises a plurality of destination devices from the set of destination devices, wherein the one or more acknowledgements comprise a plurality of acknowledgement from the plurality of destination devices, and wherein the plurality of acknowledgements are received as a single aggregated acknowledgement including the plurality of acknowledgments.

8. A system comprising:
one or more processors; and
at least one computer-readable storage medium having stored therein instructions which, when executed by the one or more processors, cause the one or more processors to perform operations comprising:
generating a first packet comprising a first array of bits and a transport protocol segment, wherein the first array of bits respectively defines a set of destination devices as respective destinations for the first packet;
transmitting, by a multi-destination relay, the first packet towards the set of destination devices;
receiving, by the multi-destination relay, one or more acknowledgements from a first subset of the set of destination devices;
based on the one or more acknowledgements, determining, by the multi-destination relay, that the first subset of the set of destination devices received the transport protocol segment in the first packet, and a second subset of the set of destination devices did not receive the transport protocol segment in the first packet;
retransmitting, by the multi-destination relay, a second packet to the second subset of the set of destination devices, wherein the second packet comprises a second array of bits, wherein the second array of bits respectively defines the second subset of the set of destination devices as the respective destinations for the second packet; and
maintaining, by the multi-destination relay, a transport layer state for each respective flow to the set of destination devices, the transport layer state comprising at least one of a send window, a receive window, one or more received acknowledgment numbers, and one or more acknowledgment sequence numbers.

9. The system of claim 8, the operations further comprising:
generating a second multicast packet by modifying the first array of bits to yield the second array of bits, wherein the first array of bits is modified by removing bits corresponding to the first subset of the set of destination devices; and
wherein retransmitting the second multicast packet comprises transmitting the second multicast packet to the second subset of the set of destination devices.

10. The system of claim 9, wherein transmitting the first multicast packet comprises transmitting content data for the set of destination devices, and wherein retransmitting the second multicast packet comprises retransmitting the content data only to those destination devices in the second subset of the set of destination devices.

11. The system of claim 10, wherein the second multicast packet comprises a transport control segment associated with transport control protocol.

12. The system of claim 8, the operations further comprising:
determining that a respective acknowledgment has not been received from a third subset of the set of destination devices within a threshold period of time;
splitting the set of destination devices into a first group of destination devices and a second group of destination devices, the first group comprising the third subset of the set of destination devices, and the second group comprising all other destination devices from the set of destination devices;
generating a third multicast packet which comprises a third array of bits which identifies the first group of destination devices as the respective destinations for the third multicast packet; and
generating a fourth multicast packet which comprises a fourth array of bits which identifies the second group of destination devices as the respective destinations for the fourth multicast packet.

13. The system of claim 12, the operations further comprising:
transmitting the third multicast packet toward the first group of destination devices, the third multicast packet being transmitted at a first time determined based on transport layer state; and
transmitting the fourth multicast packet toward the second group of destination devices, the fourth multicast packet being transmitted at a second time determined based on transport layer state.

14. The system of claim 8, wherein the first subset of the set of destination devices comprises a plurality of destination devices from the set of destination devices, wherein the one or more acknowledgements comprise a plurality of acknowledgement from the plurality of destination devices, and wherein the plurality of acknowledgements are received as a single aggregated acknowledgement including the plurality of acknowledgments.

15. A non-transitory computer-readable storage media having stored therein instructions which, when executed by a processor, cause the processor to perform operations comprising:
generating a first packet comprising a first array of bits and a transport protocol segment, wherein the first array of bits respectively defines a set of destination devices as respective destinations for the first packet;
transmitting, by a multi-destination relay, the first packet towards the set of destination devices;
receiving, by the multi-destination relay, one or more acknowledgements from a first subset of the set of destination devices;
based on the one or more acknowledgements, determining, by the multi-destination relay, that the first subset of the set of destination devices received the transport protocol segment in the first packet, and a second subset of the set of destination devices did not receive the transport protocol segment in the first packet;
retransmitting, by the multi-destination relay, a second packet to the second subset of the set of destination devices, wherein the second packet comprises a second array of bits, wherein the second array of bits respectively defines the second subset of the set of destination devices as the respective destinations for the second packet; and
maintaining, by the multi-destination relay, a transport layer state for each respective flow to the set of destination devices, the transport layer state comprising at least one of a send window, a receive window, one or more received acknowledgment numbers, and one or more acknowledgment sequence numbers.

16. The media of claim 15, the operations further comprising:
generating a second multicast packet by modifying the first array of bits to yield the second array of bits, wherein the first array of bits is modified by removing bits corresponding to the first subset of the set of destination devices; and wherein retransmitting the second multicast packet comprises transmitting the second multicast packet to the second subset of the set of destination devices.

17. The media of claim 16, wherein transmitting the first multicast packet comprises transmitting content data for the set of destination devices, and wherein retransmitting the second multicast packet comprises retransmitting the content data only to those destination devices in the second subset of the set of destination devices.

18. The media of claim 17, wherein the second multicast packet comprises a transport control segment associated with transport control protocol.

19. The media of claim 15, the operations further comprising:

determining that a respective acknowledgment has not been received from a third subset of the set of destination devices within a threshold period of time;

splitting the set of destination devices into a first group of destination devices and a second group of destination devices, the first group comprising the third subset of the set of destination devices, and the second group comprising all other destination devices from the set of destination devices;

generating a third multicast packet which comprises a third array of bits which identifies the first group of destination devices as the respective destinations for the third multicast packet; and generating a fourth multicast packet which comprises a fourth array of bits which identifies the second group of destination devices as the respective destinations for the fourth multicast packet.

20. The media of claim 19, the operations further comprising:

transmitting the third multicast packet toward the first group of destination devices, the third multicast packet being transmitted at a first time determined based on transport layer state; and transmitting the fourth multicast packet toward the second group of destination devices, the fourth multicast packet being transmitted at a second time determined based on transport layer state.

* * * * *